Patented Nov. 7, 1939

2,179,244

UNITED STATES PATENT OFFICE 2,179,244

SILVER HALIDE EMULSION FOR COLOR PHOTOGRAPHY

Wilhelm Schneider and Alfred Fröhlich, Dessau (Anhalt), Germany, assignors, by mesne assignments, to Agfa Ansco Corporation, Binghamton, N. Y., a corporation of Delaware No Drawing. Application August 13, 1937, Serial No. 158,860. In Germany August 22, 1936

8 Claims. (Cl. 95—6)

The present invention relates to silver halide emulsions for color photography.

One of its objects is to provide improved silver halide emulsions containing new dyestuff components. Other objects of the invention will appear from the following description.

Dyestuff components of particularly good fastness to diffusion are produced by using dyestuff intermediates capable of later forming the color picture which enter into direct chemical combination with a colloid suitable for forming the emulsion layer, for example gelatin or a degradation product thereof, albumen or a degradation product thereof or another protein. The chemical combination may be, for example, of the character of an acid amide, an acid group of the dyestuff intermediate reacting with the aminogroup of the albumen molecule. Of the degradation products of gelatin or albumen the most important for use in the invention are the compounds of high molecular weight. Dyestuff intermediates which are capable of combining chemically in the aforesaid manner with the colloid are, for example, α-hydroxynaphthoic acid, β-hydroxynaphthoic acid, hydroxyanthracene carboxylic acid, hydroxyfluorene carboxylic acid, salicylic acid, 2.3-hydroxycarbazole carboxylic acid. The products thus obtained are soluble in water and capable, like the acids used as the parent material, of forming dyestuffs.

These condensation products from acids and polypeptides may be added in aqueous solution to the emulsion at any desired point of the process of manufacture, it being occasionally advantageous to add some alkali to the water. The silver halide emulsions thus made with dyestuff formers fast to diffusion may be used for the production of photographic layers in known manner and the layers may be arranged on one side or on both sides of a carrier superimposed one upon the other and may be sensitized to different regions of the spectrum. The emulsions may, however, be prepared in another manner. For example, differently sensitized emulsions having different dyestuff formers may be arranged on the carrier in the form of small particles.

Color pictures may be produced in various ways, for example by one or other of the methods described in U. S. patent applications Ser. No. 10,704, filed March 12, 1935; Ser. No. 111,250, filed November 17, 1936; Ser. No. 72,718, filed April 4, 1936; Ser. No. 90,726, filled July 15, 1936; Ser. No. 94,340, filed August 5, 1936; Ser. No. 141,093, filed May 6, 1937.

The following examples illustrate the invention, but they are not intended to limit it thereto.

(1) 60 grams of finely powdered gelatin which has been dried for 10 hours at 100° C. in a high vacuum are dissolved in 300 cc. of anhydrous acetic acid. The solution is mixed with 35 grams of pure pyridine and to the mixture is added at 50° C. 60 grams of α-hydroxynaphthoic acid chloride. The whole is heated for 20 minutes at 120° C. and then poured into 1 liter of acetone. The precipitate thus produced is again dissolved in acetic acid and again precipitated. These operations are again twice repeated in order to separate all the excess of α-hydroxynaphthoic acid.

60 grams of the product obtained in this manner are added to 1 kilo of a photographic silver halide gelatin emulsion which is then cast to form a layer in the known manner.

(2) 60 grams of finely powdered gelatin which has been dried for 10 hours at 100° C. in a high vacuum are degraded by boiling for 6 hours in 300 cc. of anhydrous acetic acid, 35 grams of pyridine are added and then 60 grams of α-hydroxynaphthoic acid chloride. The whole is now heated for 4 hours at 120° C. and worked up as described in Example 1.

To 1 kilo of a photographic silver halide emulsion are added 60 grams of the product obtained in the above manner and the emulsion is cast to form a layer in the known manner.

(3) 60 grams of finely powdered serum albumen which has been dried for 10 hours at 100° C. in a high vacuum are dissolved in 300 cc. of anhydrous acetic acid, 30 cc. of pyridine are added and then 60 grams of α-hydroxynaphthoic acid chloride; heating for 1 hour at 120° C. follows. The working up is similar to that described in Example 1.

To 1 kilo of a photographic silver halide emulsion 60 grams of the product thus obtained are added and the emulsion is cast to form a layer in the known manner.

(4) 60 grams of finely powdered peptone which has been dried for 10 hours at 100° C. in a high vacuum are dissolved in 300 cc. of anhydrous acetic acid and 30 grams of pyridine are added, followed by 60 grams of salicylic acid chloride. The whole is then heated for 30 minutes at 120° C. The working up is similar to that described in Example 1.

To 1 kilo of a photographic silver halide gelatin emulsion 60 grams of the product thus obtained are added and the emulsion is then cast to form a layer in the known manner.

The color pictures may be produced, for instance, by a developer containing p-dialkylaminoaniline.

What we claim is:

1. A photographic silver halide emulsion containing a dyestuff component fast to diffusion, said dyestuff component being capable of forming a dye selected from the group consisting of quinoneimine-, azomethine- and azo dyestuffs, and being a polypeptide of a color former.

2. A silver halide gelatin emulsion for color photography containing a dyestuff component fast to diffusion with respect to the gelatin, said dyestuff component being capable of forming a dyestuff selected from the group consisting of quinoneimine-, azomethine- and azo dyestuffs in situ with a silver picture upon being contacted with a color forming developer, said dyestuff component being a polypeptide of a color former.

3. A silver halide gelatin emulsion for color photography containing a dyestuff component fast to diffusion with respect to the gelatin, said dyestuff component being capable of forming a dyestuff selected from the group consisting of quinoneimine-, azomethine- and azo dyestuffs in situ with a silver picture upon being contacted with a color forming developer, said dyestuff component containing in its molecule an acid radical substituted by a polypeptide.

4. A silver halide gelatin emulsion for color photography containing a dyestuff component fast to diffusion with respect to the gelatin, said dyestuff component being capable of forming a dyestuff selected from the group consisting of quinoneimine-, azomethine- and azo dyestuffs in situ with a silver picture upon being contacted with a color forming developer, said dyestuff component containing in its molecule a carboxylic acid radical linked to the amino group of a polypeptide.

5. The silver halide emulsion as defined in claim 1 wherein the color former is an aromatic hydroxy carboxylic acid and wherein the polypeptide is linked thereto by an amide linkage.

6. The silver halide emulsion as defined in claim 2 wherein the color former is an alpha-hydroxy-naphthoic acid and the polypeptide is gelatine which is linked to said acid by an acid amide linkage.

7. The silver halide emulsion as defined in claim 2 wherein the color former is an alpha-hydroxy-naphthoic acid and the polypeptide is albumen which is linked to said acid by an acid amide linkage.

8. The silver halide emulsion as defined in claim 2 wherein the color former is salicylic acid and the polypeptide is peptone which is linked to said acid by an acid amide linkage.

WILHELM SCHNEIDER.
ALFRED FRÖHLICH.